(12) United States Patent
Birch

(10) Patent No.: US 10,533,923 B2
(45) Date of Patent: Jan. 14, 2020

(54) WIND TUNNEL WITH AN EFFECTIVE VARIABLE NOZZLE FOR TESTING VARIOUS AEROSPACE SPECIFIC SENSORS AND PROBES

(71) Applicant: Brian Jeffrey Birch, Dowell, MD (US)

(72) Inventor: Brian Jeffrey Birch, Dowell, MD (US)

(*) Notice: Subject to any disclaimer, the term of this patent is extended or adjusted under 35 U.S.C. 154(b) by 96 days.

(21) Appl. No.: 15/816,573

(22) Filed: Nov. 17, 2017

(65) Prior Publication Data
US 2018/0202893 A1 Jul. 19, 2018

Related U.S. Application Data

(60) Provisional application No. 62/423,816, filed on Nov. 18, 2016.

(51) Int. Cl.
*G01M 9/04* (2006.01)
*G01M 9/06* (2006.01)

(52) U.S. Cl.
CPC .............. *G01M 9/04* (2013.01); *G01M 9/065* (2013.01)

(58) Field of Classification Search
None
See application file for complete search history.

(56) References Cited

U.S. PATENT DOCUMENTS

| 7,328,075 | B2* | 2/2008 | Suda | G01M 9/06 700/28 |
| 8,960,596 | B2* | 2/2015 | Kremeyer | F02K 7/14 137/15.1 |
| 2017/0316133 | A1* | 11/2017 | Abramov | G06F 17/13 |

* cited by examiner

Primary Examiner — Natalie Huls
Assistant Examiner — Jermaine L Jenkins
(74) Attorney, Agent, or Firm — Law Offices of John Skinner; John J. Skinner, Jr.

(57) ABSTRACT

An apparatus for a unique wind tunnel useable for testing aerospace specific sensors and probes is presented. The apparatus utilizes an effective variable nozzle, allows testing of aerospace devices over a near infinite Mach and Reynolds numbers in subsonic flow. The variable nozzle allows for quick and easy adjustment over a minimum 1×10^7 range of Reynolds number conditions from flow velocity of Mach 0.01 to 0.99. The optimal design of the apparatus allows for adaptation to different size test tunnels, using existing facilities to reduce cost, enabling various aerospace design applications. The apparatus of the present invention, provides a highly variable test environment in order to improve the development of advanced aerospace sensors, including benefits such as: development of flow sensors to prevent compressor stall; development of optical sensors to optimize turbine and compressor airflow; and, development of temperature sensors to increase efficiency of turbine engine operation.

10 Claims, 38 Drawing Sheets

SECTION A-A

SECTION B-B

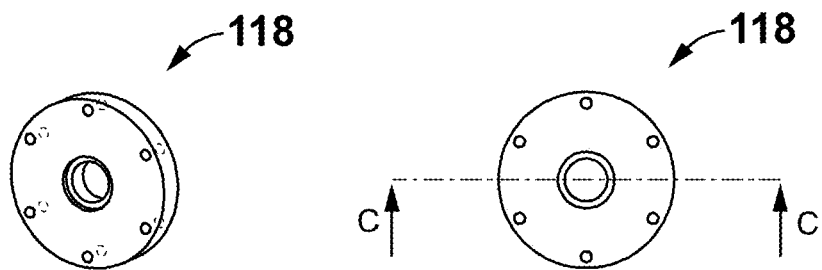
FIG. 17A  FIG. 17B
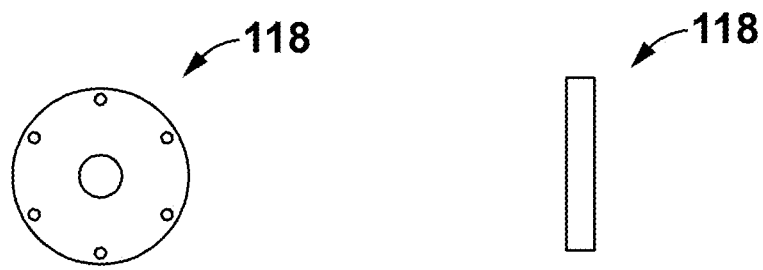
FIG. 17C  FIG. 17D
SECTION C-C
FIG. 17E

SECTION F-F

SECTION G-G

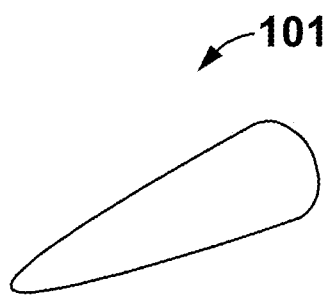
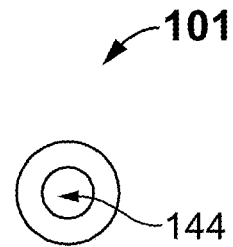
FIG. 21A      FIG. 21B
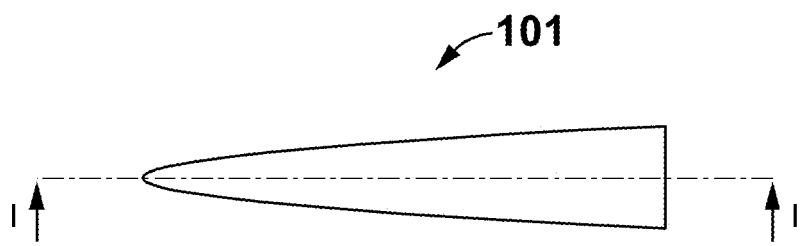
FIG. 21C
SECTION I-I
FIG. 21D

SECTION L-L $$\frac{P_0}{P} = \left(1 + \frac{\lambda-1}{2}M^2\right)^{\frac{\lambda}{\lambda-1}}$$

Equation 1: Calculates Exit Mach Numbers Based On The Set Pressures Of:
3447, 13790, 34474, 68948, 103421,
137895, 172369, 206843, 241317, 275790, & 310264 Pascals
$\lambda = 1.4$ $$\rho t = \frac{P}{RT}$$

Equation 2: Calculates Reference Density Using Set Values:
R= 287J/Kg*K Universal Gas Constant
T=Test Tunnel Set Temperatures Of 294, 422, 561, And 672 Kelvin
P=Test Tunnel Set Pressure In Pascals $$\rho = \rho t \left[1 + (0.2 M1^2)\right]^{-2.5}$$

Equation 3: Calculates Density Using Reference σ And Calculate Test Tunnel Mach $$\mu = \mu_{ref} \left(\frac{T}{T_0}\right)^{\frac{\frac{3}{2}(T_{ref}+S)}{(T+S)}}$$

Equation 4: Calculates Absolute Viscosity Of Fluid Using Set Values:

$\mu_{ref}$ = 1.716E- 5 Kg/m.s $T_0$ = 273.15 Kelvin
S = 110.4 Kelvin
T = Test Tunnel Set Temperature

FIG. 23

$$Re = \frac{\rho M1 \sqrt{\lambda RT}}{\mu}$$

Equation 5: Calculate Reynolds # Using Test Tunnel Mach & Temperature $$Mach = \frac{velocity}{local\ speed\ of\ sound},\ local\ speed\ of\ sound = \sqrt{\lambda RT}$$

$$\frac{A}{A^*} = \frac{1}{M}\left[\frac{2}{\lambda+1}\left(1+\frac{\lambda-1}{2}M^2\right)\right]^{\frac{\lambda+1}{2\lambda-2}}$$

Equation 6: First Calculate Mach At Exit Using Exit Area, Then Test Tunnel Mach With Interpolated Set Of Area Ratios $$\frac{\dot{m}}{A} = \frac{P_0\sqrt{\lambda}}{\sqrt{RT_0}}\left(\frac{1}{1+\frac{\lambda-1}{2}M^2}\right)^{\frac{\lambda+1}{2\lambda-2}}$$

Equation 7: Optional Equation To Calculate Mass Flow Rate Using Known Test Tunnel Conditions $T_0$ = Stagnation Temperature, With Adiabatic, Zero Work, Constant Specific Heat 1. M1 Represents Mach Number Inside Test Tunnel
- Me Used For Mach At Exit, With Ambient Conditions

FIG. 24

Variable Reynolds Number Test

Problem
- Develop A Method Of Varying Wind Tunnel Reynolds And
- Design A Device That Can Utilize Existing Facilities To Reduce Cost. Attempt To Replace Single Nozzle Changes With An Effective Variable Nozzle
- Design A Device That Allows Quick And Easy Adjustment Over A Wide Range Of Reynolds Number Conditions From Mach 0.01 To 0.99

FIG. 26

Benefits Of Variable Reynolds Number Test Tunnel

- Provide A Highly Variable Test Environment In Order To Improve The Development Of Advanced Aerospace Sensors, Including:
  - Flow Sensors To Prevent Compressor Stall,
  - Optical Sensors To Enhance Turbine And Compressor Airflow, And
  - Temperature Sensors To Increase Efficiency Of Turbine
- Optimal Design Will Allow For Adaptation To Different Size Test Tunnels, Thus Enabling Various Aerospace Design Applications.

FIG. 27

Initial Research

- Find Research Paper Discussing Use Of WindTunnels:
  - Design Based On FocusTopics Of Probe Testing
  - Changing Pressure,Temperature,And/or Density
  - Reynolds # And Mach # Control
- Study Research Papers To Learn Key ComponentsAnd To Understand The RequirementsTo Meet The Problem Scope
- Investigate VT Resources, Facilities And Test Equipment Available To Aid In Completing The Problem Scope

FIG. 29

Device Design Challenges

- Rarity Of Studies Or Papers Involving Small Test Tunnels Made To Test Small Devices Such As Sensors
- Similarly Sized Test Tunnels Formed That Have Similar Capabilities To The Program Scope Are Only Hypersonic Flow
- Totality Of Designs Of Variable Reynolds And Mach Numbers Require Either A Multitube Of Nozzle Swaps To Simulate Any Variance Or Changing Test Tunnel Sizing, All Of Which Is Very Costly And Time Consuming
- The Reynolds Number Is A Dimensionless Quantity Expressing The Ratio Between A Moving Fluid's Momentum And Its Viscosity

FIG. 30

**Summary Of Equipment Capabilities
Required For Test Tunnel Design**

- Sustain Necessary Pressure For Required Velocity
- Operate At Low Pressure And High Flow Rate
- Operate At High Pressure And Low Flow Rate
- Vary Temperature From Ambient To 700 Kelvin
- Control The Temperature And Pressure Settings
- Produce Valid Results Based On Initial Calibration

FIG. 31

**Summary Of Equipment Capabilities
Required For Test Tunnel Design**

- Ability To Maintain Subsonic Flow And Still Obtain Desired Reynolds Number Will Require:
  - ability To Control Air Density
  - ability To Vary And Control Air Flow Velocity
  - ability To Vary And Control Pressure And Temperature
- Optimal Design Would Allow Reynolds Number Variation Across $1 \times 10^6$ In Subsonic Conditions.

FIG. 32

Design Results

- Many Simulations And Cone Designs
- 15 Different Device Designs Calculated To Find The Optimal Range And Control Of Resulting Reynolds Number Range
- Utilizes Existing Hot Jet Test Rig To Provide Air Flow, Temperature, And Pressure Setting Control
- Simulated Various Design Ideas To Optimize Possible Test Tunnel Controlled Conditions

FIG. 33

Design Results

- 3 Variable ControlsAllows Testing Across A Wide Variety Of Conditions
- Primary Controls Include:
  - Temperature Range From Ambient To 672 Kelvin
  - Pressure Range From Ambient To 45 Psi Gauge, In 5 psi Increments
  - Device Insertion Distance Of 0 - 254 Millimeters For Fine Tuning Of Resulting Reynolds And Mach Numbers

FIG. 34

Examples Of Cone Design Considerations

$y = cx$ 12" Linear Cone $y = cx^2$ Cone Profile 6"

$y = 0.1 * cx^2 + cx$ Cone Profile 6"

$y = cx^{0.7}$ Power Series Cone Profile 8"

$y = cx^{0.5}$ Parabolic Cone Profile 8"

FIG. 35

Summary Of Accomplisments

- Variable Reynolds ReferenceTables
- Constant Mach Variable Reynolds Reference Tables
- Optimized Range Of Obtainable Reynolds Numbers UsingAvailable Resources With Minimal Alteration
- Ability To Change DesignTo AccommodateA Wide Variety Of Test Tunnel Sizes via Direct Extrapolation Using Tunnel/Exit Area Ratios

FIG. 36

Summary Of Accomplishments

- Ability To Vary Reynolds Number Across A Range Of $5.5 \times 10^7$ While Holding Mach Number Constant Or Varying Mach From 0.01 To 0.99
- Ability To Control Mass Flow Rate With Varying Temperature And Mach
- Simple Device Design That Can Be Optimized For Many Ranges Of Wind Tunnel Sizes, Pressures, and Temperatures-key Feature For Future Designs

FIG. 37

Summary Of Accomplishments

- Device Design Which Utilizes Existing And Available VT Facilities And Equipment
- Design Allows For Wind Tunnel Testing Of Sensors, Gauges, And Other Reynolds And Subsonic Mach Dependent Objects
- Lookup Tables And Simple Adjustment Methods Allow Quick And Easy Test Tunnel Condition Changes

FIG. 38

WIND TUNNEL WITH AN EFFECTIVE VARIABLE NOZZLE FOR TESTING VARIOUS AEROSPACE SPECIFIC SENSORS AND PROBES

CROSS REFERENCE TO PRIOR APPLICATION

This patent application claims the benefit of U.S. Provisional Application No. 62/423,816 filed on Nov. 18, 2016. The above provisional application is incorporated by reference herein in its entirety.

FIELD OF THE INVENTION

The present invention relates to an apparatus for a wind tunnel with an effective variable nozzle for testing of various aerospace specific sensors and probes, and, more particularly, to a variable nozzle for a wind tunnel device that allows for valid and effective aerospace testing at differing pressures, air flow rates and temperatures, even at subsonic speeds.

BACKGROUND OF THE INVENTION

The development of a wind tunnel with continuous control over the air flow parameters has been increasingly demanded as it helps in measuring aerodynamic forces, pressure distribution, or other aerodynamic-related characteristics. Since the air speed in a wind tunnel is determined completely by the geometry of the nozzle, it is necessary to provide a different nozzle shape for each different required speed. To change the effective cross-sectional area of the entrance end of the tunnel the nozzle must be changed, an operation which usually requires several hours. This not only adds considerably labor cost of the testing operation, but also, in elect, wastes valuable time in which the test equipment is idle. Further, this type of wind tunnel precludes changing the effective cross-sectional area of the tunnel while it is in operation, but also does not allow a smooth change in such area, since the different replacement nozzles must of necessity differ appreciably from each other.

Therefore, there is need for a variable nozzle for a wind tunnel device that allows for valid and effective aerospace testing at differing pressures, air flow rates and temperatures, even at subsonic speeds.

SUMMARY OF THE INVENTION

The present invention is directed to providing a wind tunnel apparatus with an effective variable nozzle that allows for: sustaining necessary pressure for required velocity of Mach $<=1.00$; operation at low pressures and a high flow rate; operation at high pressures and a low flow rate; vary temperature from ambient to a minimum of 700 degrees Kelvin; controlling and maintaining the set temperature and pressure settings; producing valid results based on initial calibration; and, an ability to maintain subsonic flow and still obtain desired Reynolds numbers, which further requires: and ability to control and maintain air density, which can be accomplished by controlling temperature and pressure settings, and control and maintain set air flow velocity.

The apparatus comprising a variable air heater, a pressure release value system, and a variable nozzle comprising an inverse cone assembly. The apparatus allows for continuously adjustable Reynolds Number or Mach Number defined subsonic air flow parameter. The variable air heater is configured to allow for a static setting of a temperature. The pressure release valve system is configured to allow for a static setting of an air pressure. The inverse cone assembly of the nozzle allows for a precise set of an air flow exit area. The inverse cone assembly comprises an adjustment rod, a cone, that is connected and locked onto the adjustment rod. The cone and the rod are supported by a stainless end flange with a thickness that allows for minimal movement along the y and z axis through its x axis insertion distance.

In one embodiment, the variable nozzle is constructed of stainless steel. In one embodiment, the inverse cone assembly is 10 inches in length and the cone is 2 inches in diameter at its widest end. In one embodiment, a shape of the cone is defined according to the equation $y=(x/10)0.7$. In one embodiment, the cone further comprises a cutout portion designed to allow for threaded receiving of the adjustment rod. In one embodiment, the adjustment rod is 17.50 inches in overall length and 1.25 inches in overall diameter. In another embodiment, the adjustment rod further comprises a chamfer lead in/out edge measuring 1.50 inches in length.

BRIEF DESCRIPTION OF THE DRAWINGS

FIG. 17A illustrates a perspective view of a second adapter flange of the test tunnel, according to an embodiment of the present invention.

FIG. 17B illustrates a front view of the second adapter flange of the test tunnel, according to an embodiment of the present invention.

FIG. 17C illustrates a rear view of the second adapter flange of the test tunnel, according to an embodiment of the present invention.

FIG. 17D illustrates a side view of the second adapter flange of the test tunnel, according to an embodiment of the present invention.

FIG. 17E illustrates a cross-sectional view of the second adapter flange of the test tunnel along the line C-C of FIG. 17B, according to an embodiment of the present invention.

FIG. 21A illustrates perspective view of a variable cone, according to one embodiment of the present invention.

FIG. 21B illustrates rear view of the variable cone, according to one embodiment of the present invention.

FIG. 21C illustrates side view of the variable cone, according to one embodiment of the present invention.

FIG. 21D illustrates cross-sectional view of the variable cone along the line I-I' of FIG. 21C, according to one embodiment of the present invention.

FIGS. 23-24 illustrates formulas used for the design of the wind tunnel device, according to an embodiment of the present invention.

FIGS. 26-38 illustrate various aspects of the wind tunnel device, according to an embodiment of the present invention.

DETAILED DESCRIPTION

Referring to FIGS. 1 through 5, it is clear to see the primary components of the wind tunnel device or apparatus 100.

Figure 1:
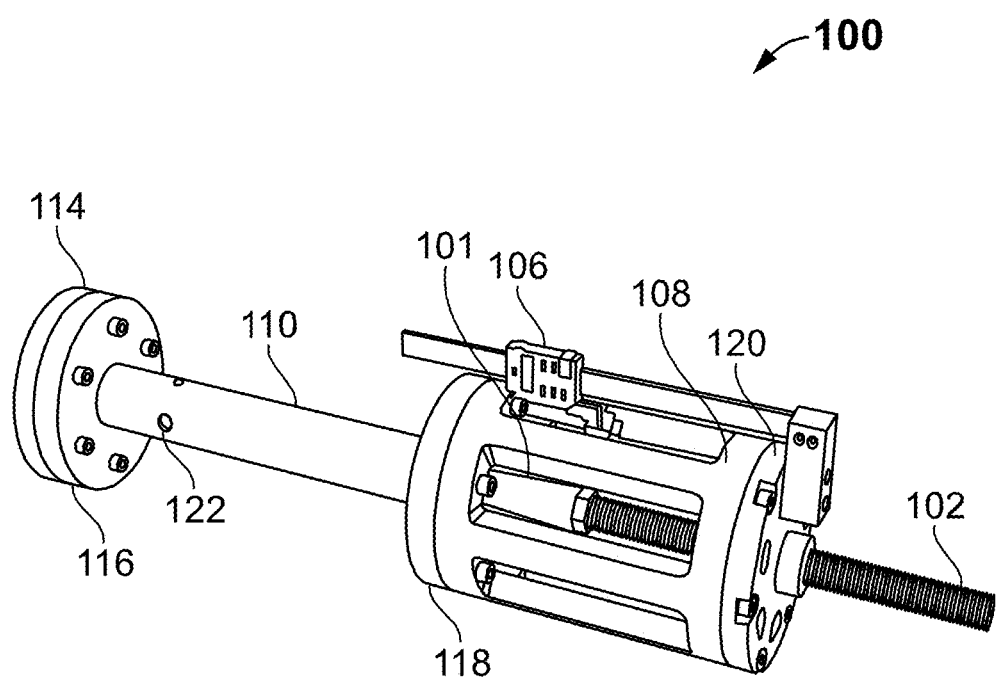
FIG. 1 is a picture of the wind tunnel device, according to an embodiment of the present invention.
Figure 2:
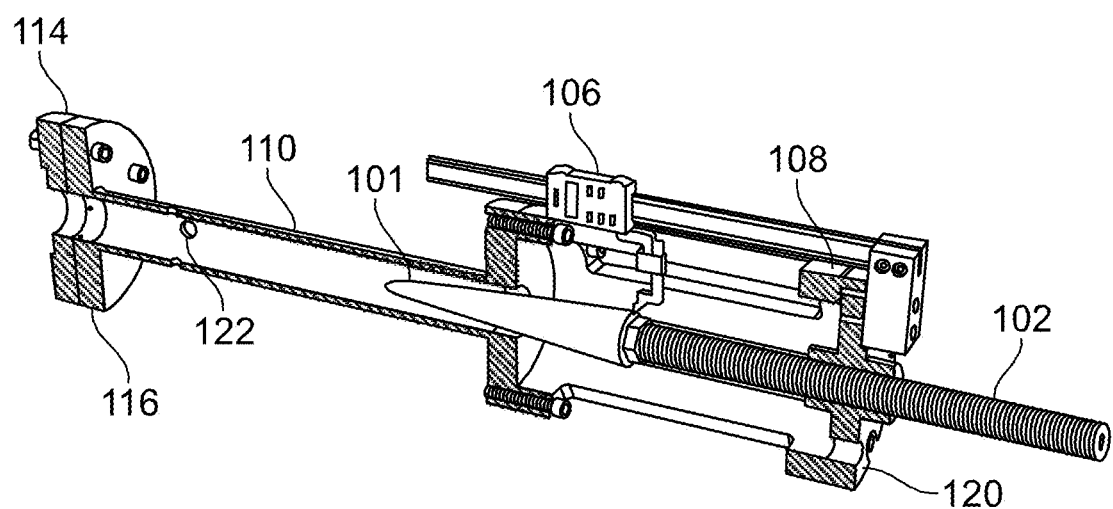
FIG. 2 illustrates a cutaway of the completed wind tunnel device showing the cone inserted 5", according to an embodiment of the present invention.
Figure 3:
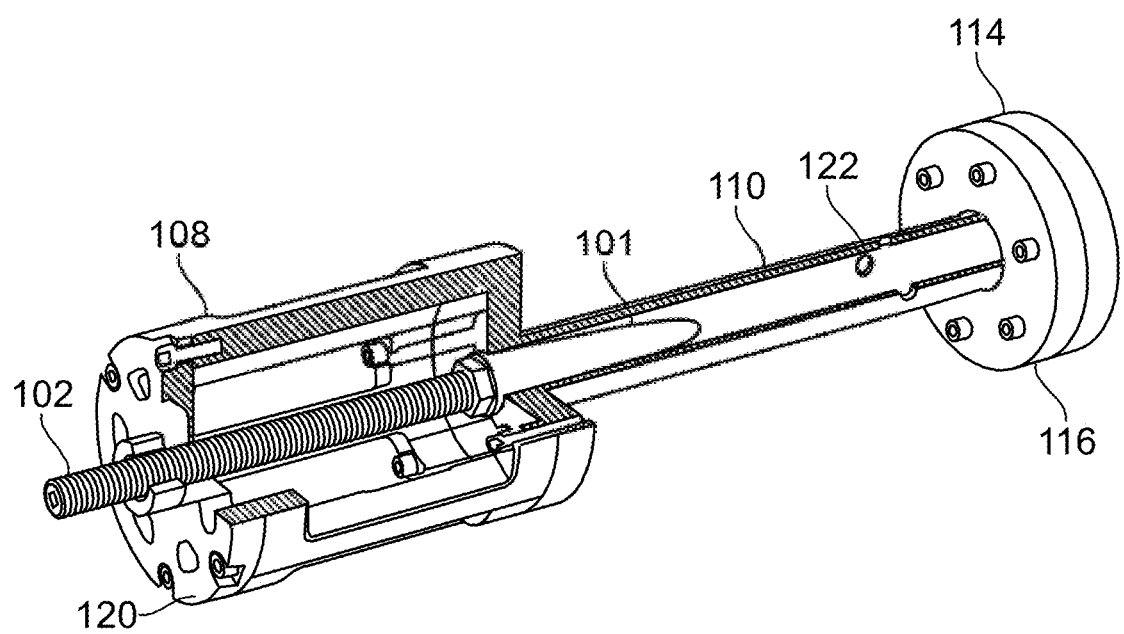
FIG. 3 illustrates a cutaway of the completed wind tunnel device accenting the connecting bolts and the machine polished finish of the cone itself, according to an embodiment of the present invention.
Figure 4:
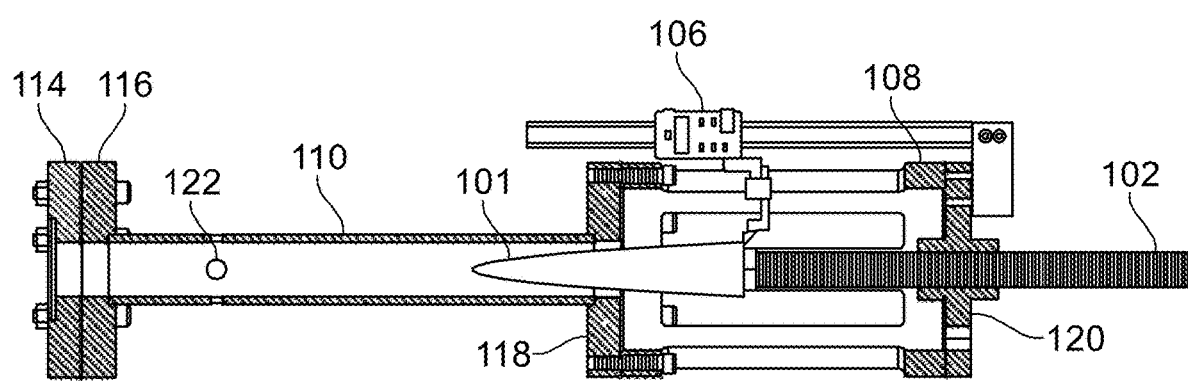
FIG. 4 illustrates a cutaway of the completed wind tunnel device accenting flanges and the measurement device probe to the end of the cone, according to an embodiment of the present invention.
Figure 5:
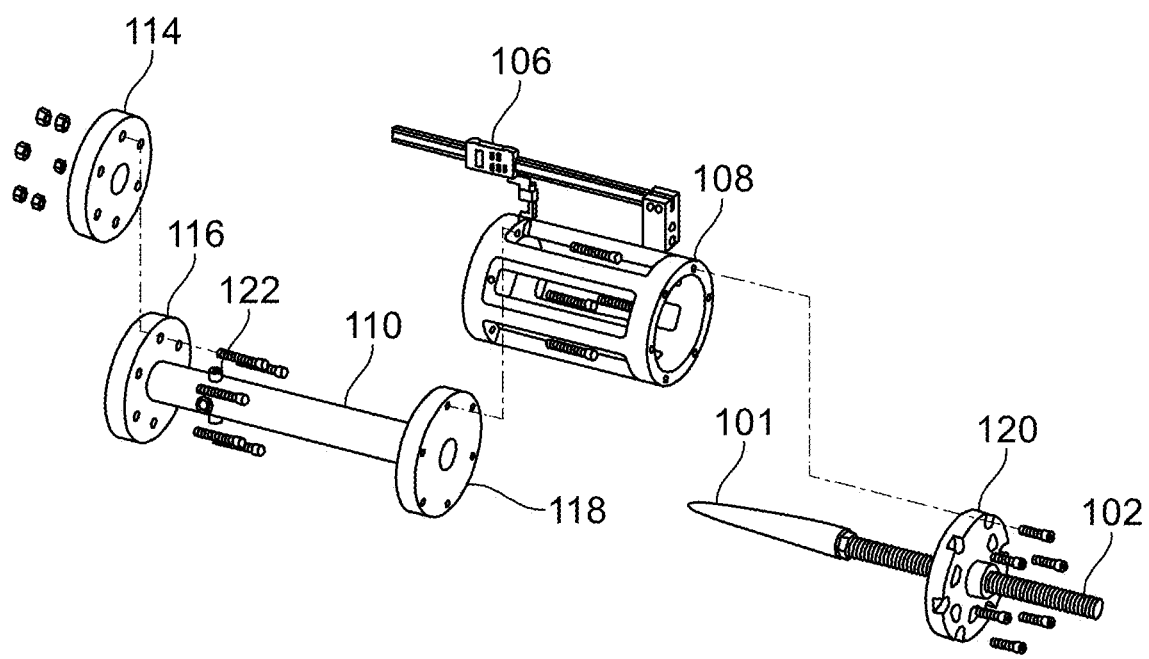
FIG. 5 illustrates the assembly details of the wind tunnel device, according to an embodiment of the present invention.

Referring specifically now to FIGS. 1 and 2, the cone/nozzle 101 is constructed of 304 Stainless Steel, connected and locked onto a course threaded adjustment rod 102, that is supported by a stainless end flange with a thickness that allows for minimal movement along the y and z axis through its x axis insertion distance.

The test tunnel portion 110 is connected to the adjustable device and the adapter flange 114 to the Hot Jet Test Rig 104 via Stainless Steel adapter flanges (116, 118), welded to each end of the test tunnel 110, also made of 304 Stainless Steel. 4 NPT ports 122 are tapped around the circumference of the test tunnel 110 near the entrance to reduce possible turbulence in that region caused by the cone 101 insertion distance for more accurate test probe measurements. The adjustable device housing is currently designed with 6061-T6 anodize aluminum, though if the convection temperature at the higher ranges may require this to be constructed of 304 Stainless Steel as well. Aluminum lightens the device 100 significantly, and would be recommended unless an additional support can be added under the device 100. The measurement device 106 is made partially of an off the shelf height caliper, though the base is customized to attach to the end flange, and the measurement probe is designed to reach the end of the cone to make the cone 101 insertion distance simple and easy to measure. The detail drawings for all of the components of the final device design can be found in the engineering schematics (which will be described in detail in FIGS. 14A-22E).

In an embodiment, the apparatus 100 comprises a variable air heater, a pressure release value system, and a variable nozzle 101 comprising an inverse cone assembly. The apparatus 100 allows for continuously adjustable Reynolds Number or Mach Number defined subsonic air flow parameter. The variable air heater is configured to allow for a static setting of a temperature. The pressure release valve system is configured to allow for a static setting of an air pressure. The inverse cone assembly of the nozzle 101 allows for a precise set of an air flow exit area. The inverse cone assembly comprises an adjustment rod 102, a cone 101, that is connected and locked onto the adjustment rod 102. The cone 101 and the rod 102 are supported by a stainless end flange with a thickness that allows for minimal movement along the y and z axis through its x axis insertion distance.

In one embodiment, the variable nozzle 101 is constructed of stainless steel. In one embodiment, the inverse cone assembly is 10 inches in length and the cone is 2 inches in diameter at its widest end. In one embodiment, a shape of the cone 101 is defined according to the equation $y=(x/10)0.7$. In one embodiment, the cone 101 further comprises a cutout portion 114 designed to allow for threaded receiving of the adjustment adjustable rod 102. In one embodiment, the adjustment rod 102 is 17.50 inches in overall length and 1.25 inches in overall diameter. In another embodiment, the adjustment rod 102 further comprises a chamfer lead in/out edge 112 measuring 1.50 inches in length.

Figure 6:
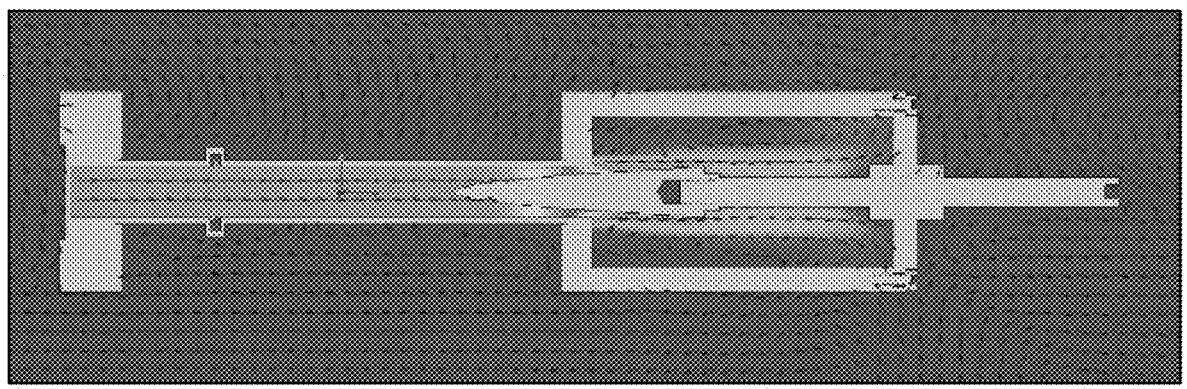
FIG. 6 illustrates a simulated flow of the wind tunnel device at Mach 0.9, ½ total device insertion distance, according to an embodiment of the present invention.

SolidWorks was used to create flow models, showing the approximate flow velocity during a variety of conditions to ensure steady flow through the test tunnel 110 and into ambient air through the exhaust ports designed in the variable device housing and the end flange. Referring now to FIG. 6, this figure illustrates the simulated flow through the device 100 at 45 psig test tunnel pressure, 294 Kelvin tunnel temperature, and Mach 0.9. The flow diagram describes flow velocity for low to high by varying the colors from light blue to red respectively. With the cone 101 at ½ of total insertion distance, it shows steady flow in the test tunnel 110 for improved test probe accuracy, and a sharp increase as expected at the cone/tunnel interface just as you would expect with a nozzle. The flow then dissipates desirably into the ambient air.

Figure 7:
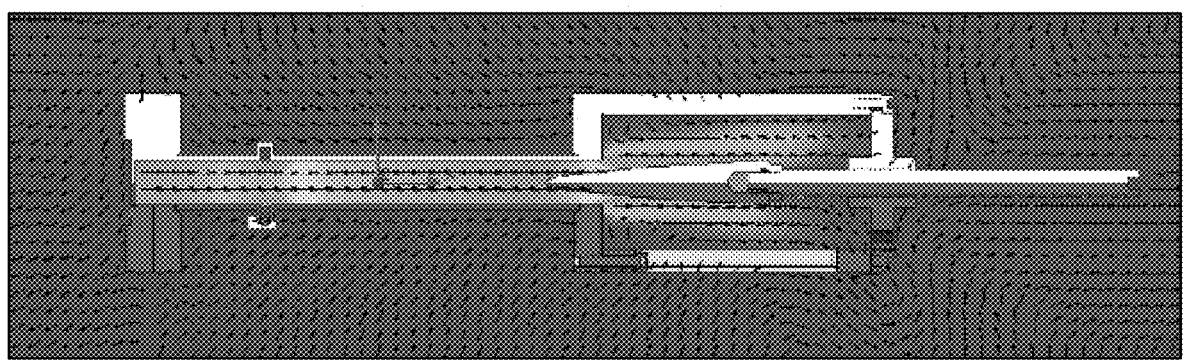
FIG. 7 illustrates a simulated flow of the wind tunnel device at Mach 0.9, ⅕ total cone insertion distance, according to an embodiment of the present invention.

Referring now to FIG. 7, this figure illustrates the simulated flow just as the previous diagram through the device 100 at 45 psig test tunnel pressure, 294 Kelvin tunnel temperature, and Mach 0.9. The flow diagram describes flow velocity from low to high by varying the colors from light blue to red respectively. With the cone 101 at ⅕ of total insertion distance, it still shows steady flow in the test tunnel 110 though with higher velocities beginning shortly after the test ports. However, with the cone 101 further out of the test tunnel 110, similar to a larger diameter nozzle, the velocity increase at the exit is not as high. The flow still dissipates desirably into the ambient air.

Figure 8:
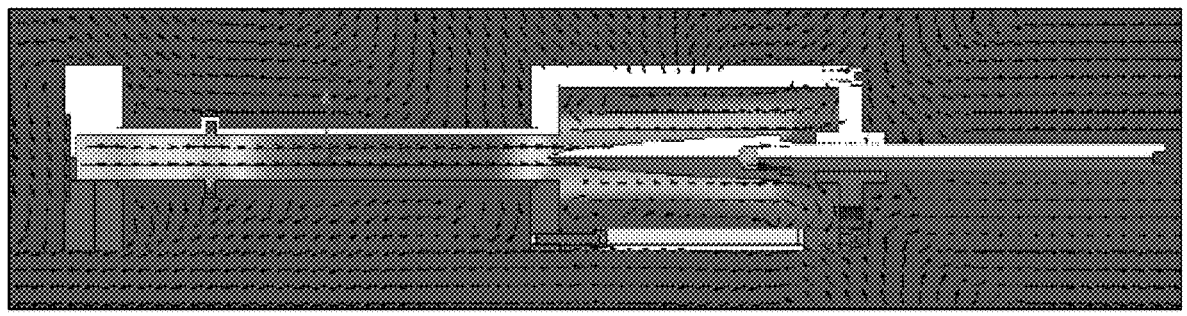
FIG. 8 illustrates a simulated flow of the wind tunnel device at Mach 0.9 with cone fully out of test tunnel, according to an embodiment of the present invention.

Referring now to FIG. 8, this figure illustrates the simulated flow just as the previous diagram through the device 100 at 45 psig test tunnel pressure, 294 Kelvin tunnel temperature, and Mach 0.9. The flow diagram describes flow velocity from low to high by varying the colors from light blue to red respectively. However, with the cone 101 completely out of the tunnel 110, essentially removing the nozzle, the test tunnel 110 velocity rises sharply past the test tunnel ports. The velocity slows at the exit, though still has higher velocities inside the device housing than in the previous examples. Though it is not definitive, boundary layer issues may play a part in this. Also, though the cone setting mimics a "no-nozzle" condition, the bulk of the cone assembly is still in the direct exit airflow. The data also shows unpredictable data when the cone is at the fully out state. However, the device 100 was not designed for this condition, and all other cone insertion distances have a steadier flow at all points through the device.

Figure 9:
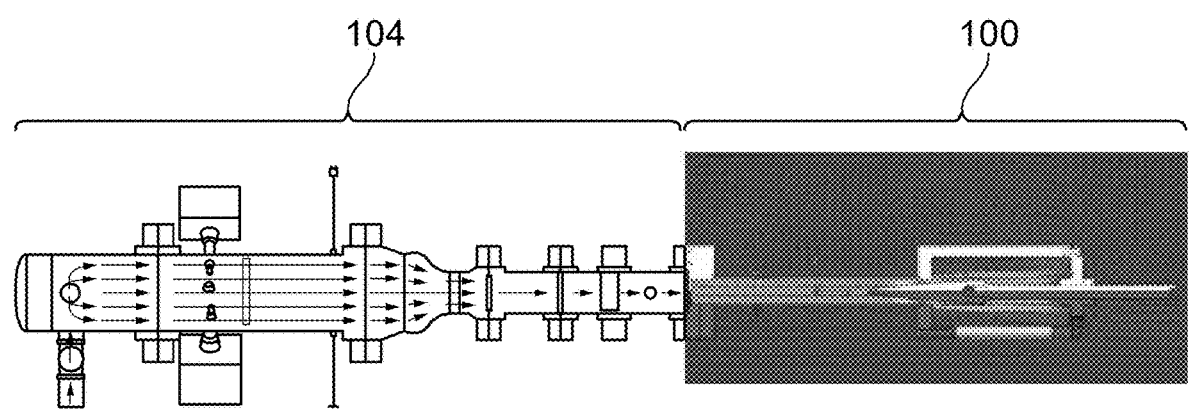
FIG. 9 illustrates how the final device connects to the Hot Jet Test Rig, according to an embodiment of the present invention.

Referring now to FIG. 9, this figure illustrates how the final variable Reynolds and Mach number Device 100 attaches to the existing Hot Jet Test Rig 104, and simulates the flow continuing through the entirety of the system, including the initial jets, air flow heater, honeycomb flow straightening screens, and the impinging jets for controlling pressure. The Reynolds number is defined as a dimensionless quantity expressing the ratio between a moving fluid's momentum and its viscosity. The design of the nozzle apparatus allows for the control of variable Reynolds Number, while keeping the test tunnel Mach constant. This is especially valuable for aerospace applications, as there are many conditions, especially within the engines where density and flow conditions vary widely, and Mach number is not an effective predictor of the engine behavior.

Figure 10:
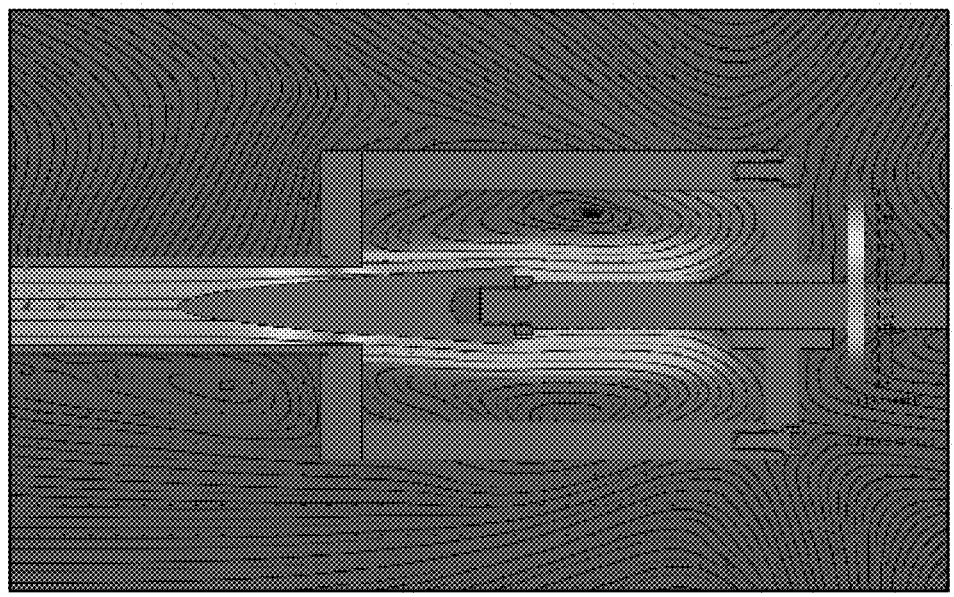
FIG. 10 illustrates a simulated flow of the wind tunnel device, with the cone at ½ of the total insertion distance, according to an embodiment of the present invention.
Figure 11:
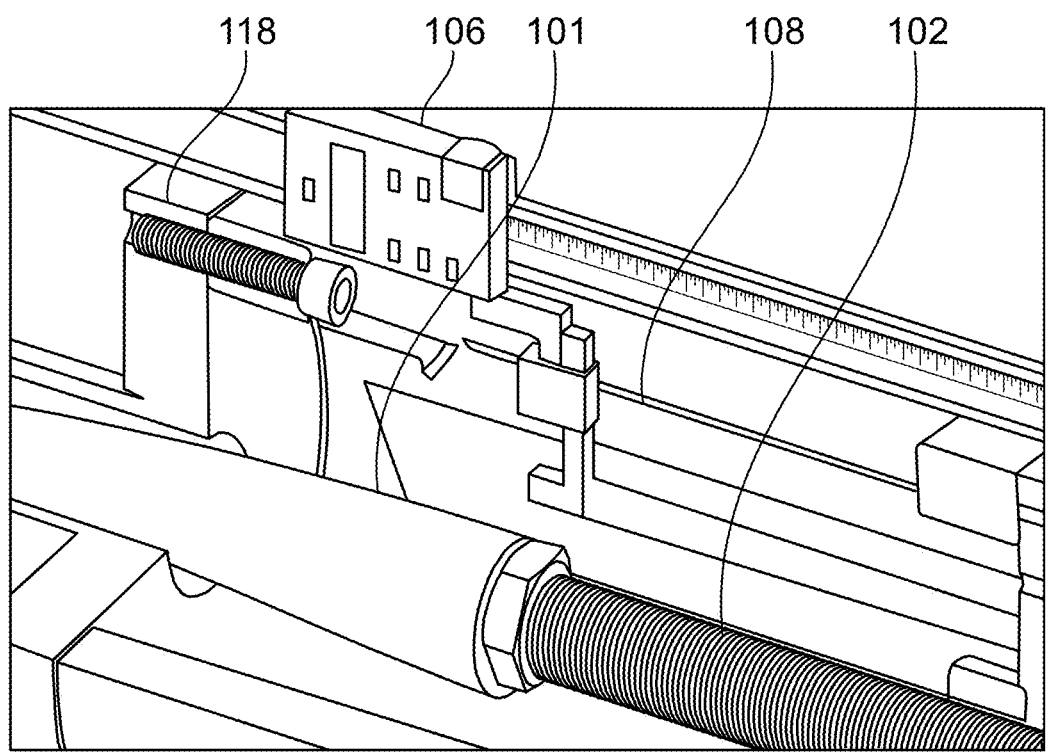
FIG. 11 illustrates a zoom view of the device, with the cone at ½ of the total insertion distance, according to an embodiment of the present invention.
Figure 12:
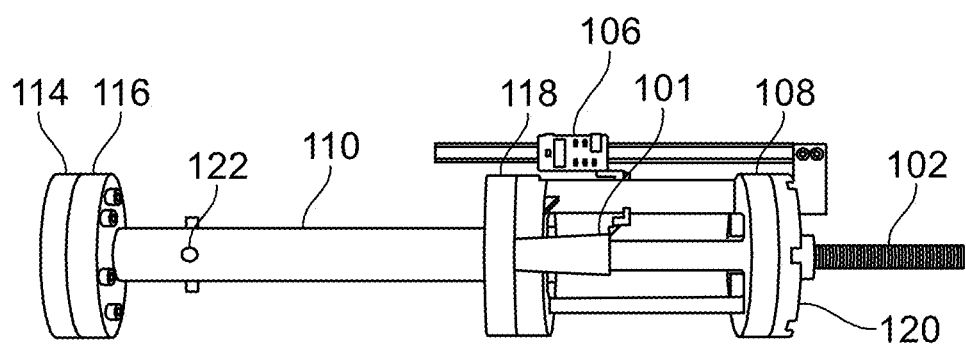
FIG. 12 illustrates a side view of the wind tunnel device, according to an embodiment of the present invention.
Figure 13A:
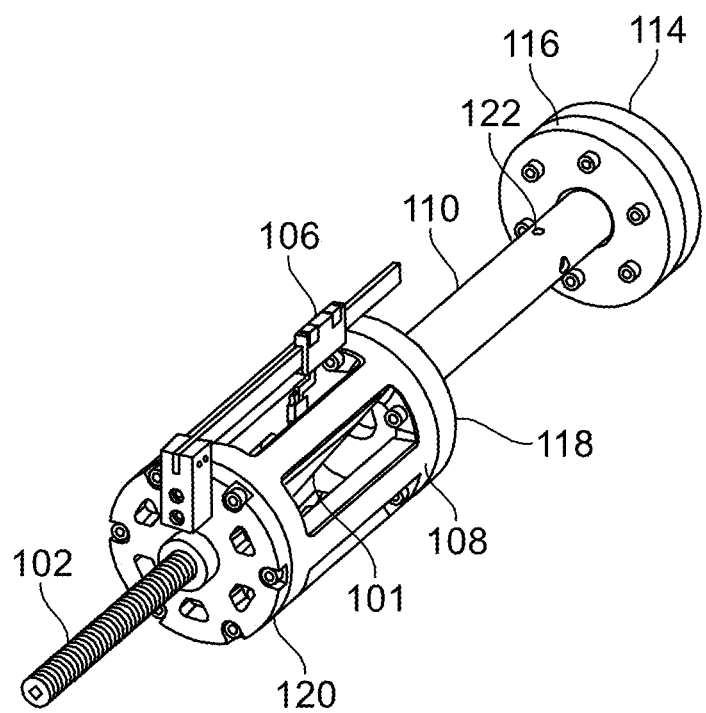
FIG. 13A illustrates a perspective view of wind tunnel device with adjustable rod in the housing of the device, according to an embodiment of the present invention.
Figure 13B:
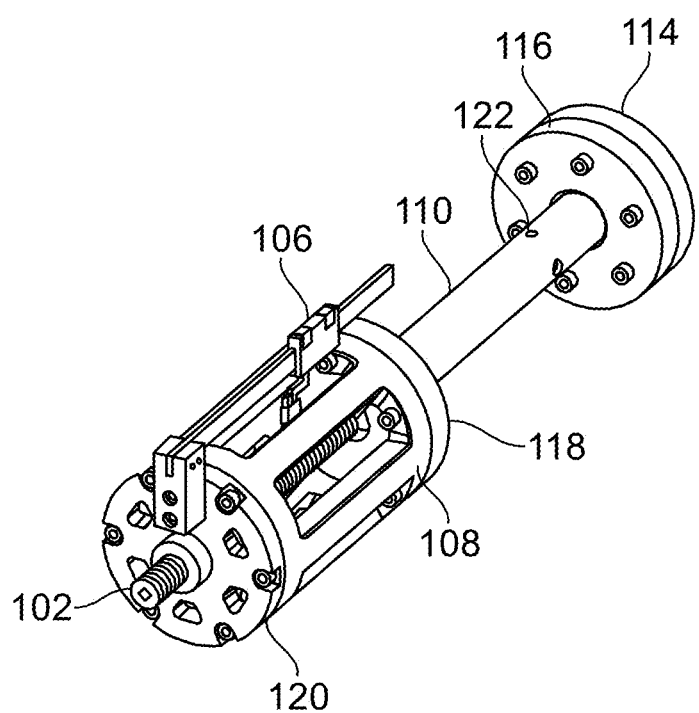
FIG. 13B illustrates a perspective view of wind tunnel device with adjustable rod threaded into the test tunnel, according to an embodiment of the present invention.
Figure 14A:
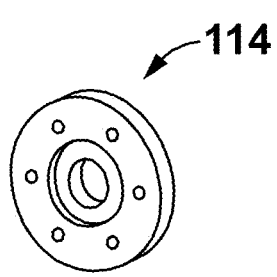
FIG. 14A illustrates a perspective view of an adapter flange of the wind tunnel device, according to an embodiment of the present invention.
Figure 14B:
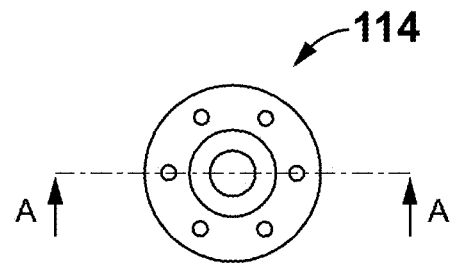
FIG. 14B illustrates a front view of the adapter flange of the wind tunnel device, according to an embodiment of the present invention.
Figure 14C:
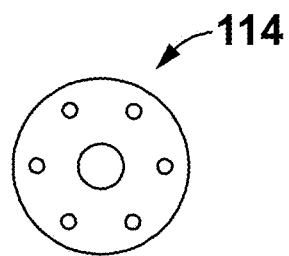
FIG. 14C illustrates a rear view of the adapter flange of the wind tunnel device, according to an embodiment of the present invention.
Figure 14D:
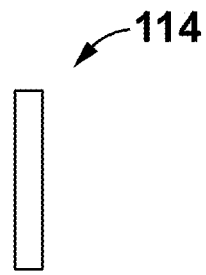
FIG. 14D illustrates a side view of the adapter flange of the wind tunnel device, according to an embodiment of the present invention.
Figure 14E:
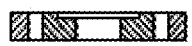
FIG. 14E illustrates a cross-sectional view of an adapter flange of the wind tunnel device along the line A-A of FIG. 14B, according to an embodiment of the present invention.
Figure 15A:
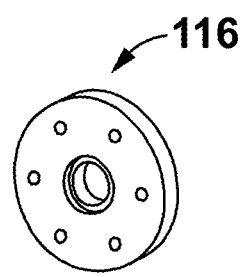
FIG. 15A illustrates a perspective view of a first adapter flange of the test tunnel, according to an embodiment of the present invention.
Figure 15B:
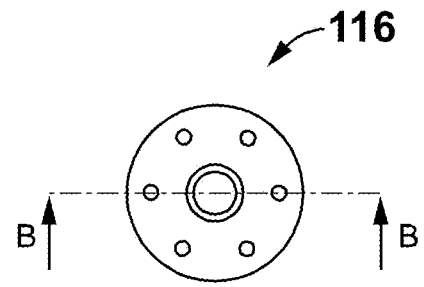
FIG. 15B illustrates a front view of the first adapter flange of the test tunnel, according to an embodiment of the present invention.
Figure 15C:
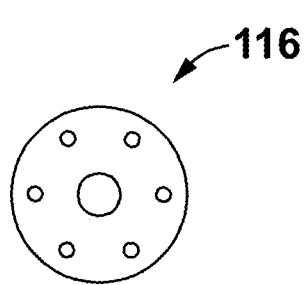
FIG. 15C illustrates a rear view of the first adapter flange of the test tunnel, according to an embodiment of the present invention.
Figure 15D:
FIG. 15D illustrates a side view of the first adapter flange of the test tunnel, according to an embodiment of the present invention.
Figure 15E:
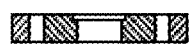
FIG. 15E illustrates a cross-sectional view of the first adapter flange of the test tunnel along the line B-B of FIG. 15B, according to an embodiment of the present invention.
Figure 16A:
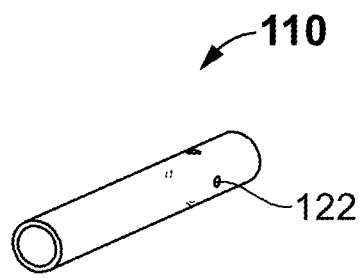
FIG. 16A illustrates a perspective view of an air flow tube of the test tunnel, according to an embodiment of the present invention.
Figure 16B:
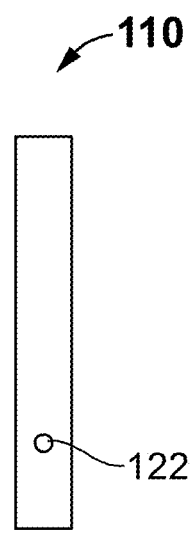
FIG. 16B illustrates a side view of the air flow tube of the test tunnel with ¼ NPT port, according to an embodiment of the present invention.
Figure 16C:
FIG. 16C illustrates a side view of the air flow tube of the test tunnel with ¼ NPT port, according to an embodiment of the present invention.
Figure 16D:
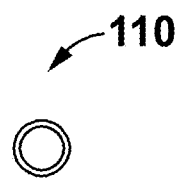
FIG. 16D illustrates a top view of the air flow tube of the test tunnel, according to an embodiment of the present invention.
Figure 18A:
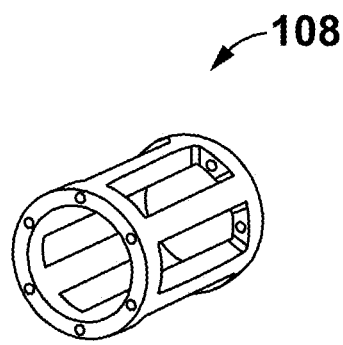
FIG. 18A illustrates a perspective view of a variable cone housing, according to one embodiment of the present invention.
Figure 18B:
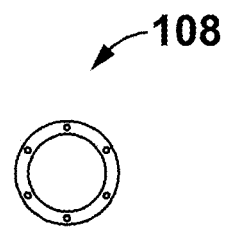
FIG. 18B illustrates a front view of the variable cone housing, according to one embodiment of the present invention.
Figure 18C:
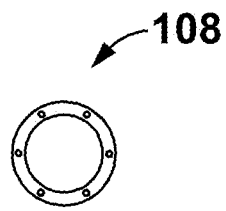
FIG. 18C illustrates a rear view of the variable cone housing, according to one embodiment of the present invention.
Figure 18D:
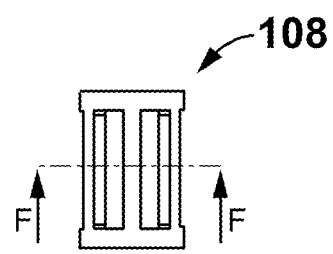
FIG. 18D illustrates a side view of the variable cone housing, according to one embodiment of the present invention.
Figure 18E:
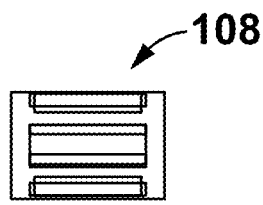
FIG. 18E illustrates a side view of the variable cone housing, according to another embodiment of the present invention.
Figure 18F:
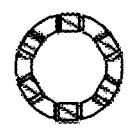
FIG. 18F illustrates a cross-sectional view of a variable cone housing along the line F-F' of FIG. 18D, according to one embodiment of the present invention.
Figure 19A:
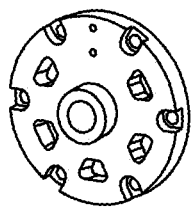
FIG. 19A illustrates a perspective view of a housing cap, according to one embodiment of the present invention.
Figure 19B:
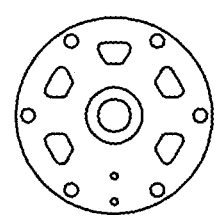
FIG. 19B illustrates a rear view of the housing cap, according to one embodiment of the present invention.
Figure 19C:
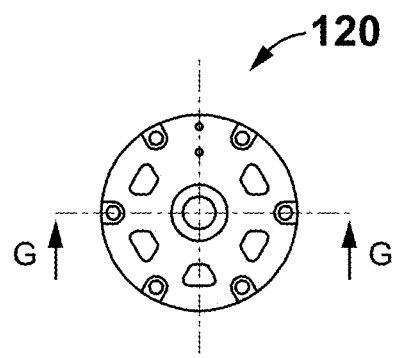
FIG. 19C illustrates a front view of the housing cap, according to one embodiment of the present invention.
Figure 19D:
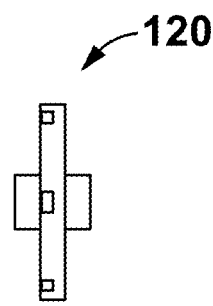
FIG. 19D illustrates a side view of the housing cap, according to one embodiment of the present invention.
Figure 19E:
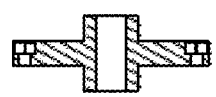
FIG. 19E illustrates a cross-sectional view of a housing cap along the line G-G of FIG. 19C, according to one embodiment of the present invention.
Figures 20A, 20B, 20C:
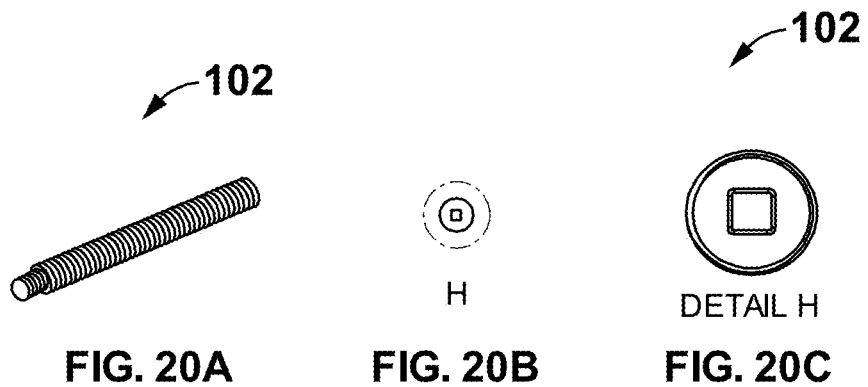
FIG. 20A illustrates a perspective view of an adjustable rod, according to one embodiment of the present invention.
FIG. 20B illustrates a bottom view of the adjustable rod, according to one embodiment of the present invention.
FIG. 20C illustrates details of the bottom view of the adjustable rod represented as H in FIG. 20B, according to one embodiment of the present invention.
Figures 20D, 20E:
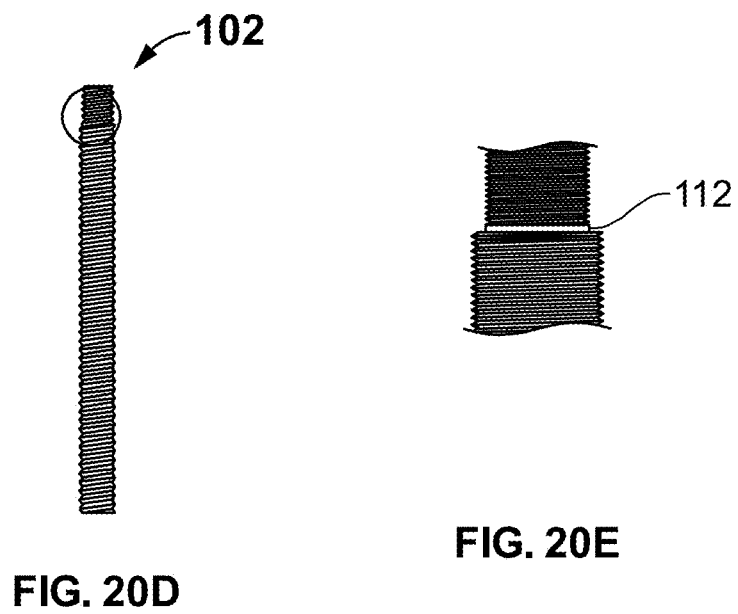
FIG. 20D illustrates a side view of the adjustable rod, according to one embodiment of the present invention.
FIG. 20E illustrates a chamfer lead in/out edges of the adjustable rod, according to one embodiment of the present invention.

Referring now to FIG. 10, this figure illustrates the simulated air flow velocity of the device 100, with the cone 101 at ½ of the total insertion distance. The flow diagram describes flow velocity of high to low by varying the colors, wherein red shows high velocity, transitioning to blue shows lowest velocity. FIG. 11 illustrates a zoom view of the device 100, with the cone 101 at ½ of the total insertion distance, according to an embodiment of the present invention. A side view of the wind tunnel device 100 is illustrated in FIG. 12. FIG. 13A illustrates a perspective view of wind tunnel device 100 with adjustable rod 102 in the housing 108 of the device 100, according to an embodiment of the present invention. FIG. 13B illustrates a perspective view of wind tunnel device 100 with adjustable rod 102 into the test tunnel 110, according to an embodiment of the present invention.

Referring to FIGS. 14A-14E, the design of an adapter flange 104 of the present invention according to the preferred embodiment is shown in details. In an embodiment, the adapted flange 104 is disposed at one end of the test tunnel 110. The adapted flange 104 facilitates to attachment of the device 100 to conventional device such as existing Hot Jet Test Rig 104.

Referring to FIGS. 15A-15E, the design of a first adapter flange 116 disposed on one end of the air flow tube of the test tunnel 110 of the present invention, according to the preferred embodiment is shown in details. A second adapted flange 118 is disposed on the other end of the air flow tube of the test tunnel 110 of the present invention, according to the preferred embodiment is shown in details in FIGS. 17A-17E. In one embodiment, the first adapter flange 116 is attached to the adapter flange 114 that connects conventional device such as existing Hot Jet Test Rig 104 and the second adapter flange 118 is attached to the housing 108.

Referring to FIGS. 16A-16D the design of the air flow tube of the present invention, according to the preferred embodiment is shown in details. In one embodiment, the air flow tube comprises ½" NPT. In one embodiment, the air flow tube comprises ¼" NPT. The device design also allows: for sensor testing in a test tunnel 110. In one embodiment, a device to be tested is placed in the test tunnel 110.

Referring to FIGS. 18A-18F, a variable cone housing 108 of the device 100 of the present invention, according to the preferred embodiment is shown in details. The variable cone housing 108 is configured to support the cone/nozzle 101 comprising an inverse cone assembly. Further, the variable cone housing 108 adapted support the cone 101 when threaded in and out of the test tunnel 110. Referring to FIGS. 19A-19E, a housing cap 120 of the device 100 of the present invention, according to the preferred embodiment is shown in details.

Referring now specifically to FIGS. 20A-20E, the design of the adjustment rod 102 of the present invention according to a preferred embodiment is shown in detail. The overall length of the adjustment rod 102 is 17.50 inches, with a chamfer lead in/out edge 112 measuring 1.50 inches in length. The chamfer lead in/out 112 allows for good thread starts when connected to the cone/nozzle 101. The overall diameter of the adjustment rod 102 is 1.25 inches. The threads of the adjustment rod enable the cone/nozzle 101 allows to move in and out of the test tunnel 110.

Referring now specifically to FIG. 21A-21D, the design of the cone/nozzle 101 of the present invention according to a preferred embodiment is shown in detail. The length of the cone/nozzle 101 is 10.00 inches, while the diameter of the cone/nozzle 101 is 2.00 inches at its widest end, with a cone shape according to the equation: $y=(x/10)^{0.7}$. A cutout 144 is provided for insertion/receiving of the adjustment rod 102. Preferably, the adjustment rod 102 is threaded. In one embodiment, the cone/nozzle 101 is an inverse cone assembly. The inverse cone assembly of the nozzle allows for a precise set of an air flow exit area.

The variable nozzle design allows for full control of a completed cone design and is easily adaptable for connection to existing wind tunnel test devices (such as a Hot Jet Test Rig). The design also allows: for probe sensor testing in a test tunnel of an appropriate size for the cone design, for the airflow from the test tunnel to escape into ambient with the least impediment to reduce turbulence, for simple and accurate adjustment of the cone location, and for simple and accurate measurement of the cone insertion distance.

It is to be understood, of course, the variable nozzle apparatus can be scaled for larger wide tunnels due to the adaptable design and would require only minor modification to also test hypersonic and supersonic conditions. Such modifications are to be considered as within the scope of the present invention. Additionally, and as such, manufacturing and assembly of the device are simplified even if device changes are required.

Figure 22A:
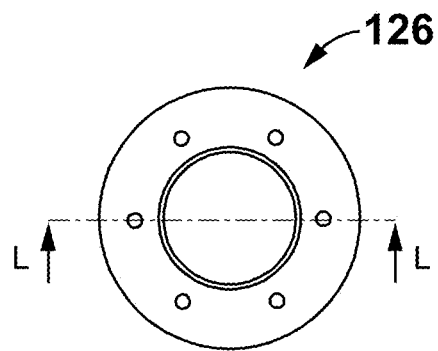
FIGS. 22A-22D illustrates front view of choke plates of various size, according to one embodiment of the present invention.
Figure 22B:
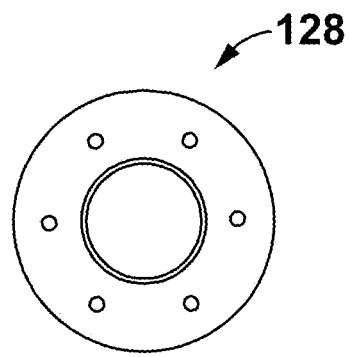
Figure 22C:
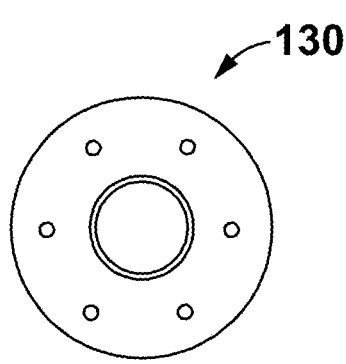
Figure 22D:
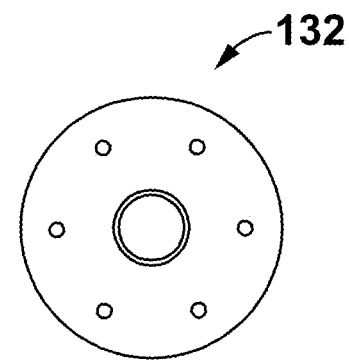
Figure 22E:
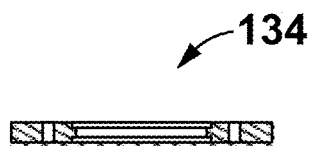
FIG. 22E illustrates cross-sectional view of the choke plate along the line L-L of FIG. 22A, according to one embodiment of the present invention.

Referring to FIGS. 22A-22D, choke plates (126, 128, 130, 132, 134) of various size, according to the preferred embodiment is shown in details. FIG. 22E illustrates cross-sectional view of the choke plate 126 along the line L-L of FIG. 22A, according to one embodiment of the present invention. In one embodiment, the choke plates (126, 128, 130, 132, 134) is disposed at the end test tunnel 110 is adapted to increase the air speed even before inserting the cone 101, when started with a Mach number zero or higher than zero.

Figure 25:
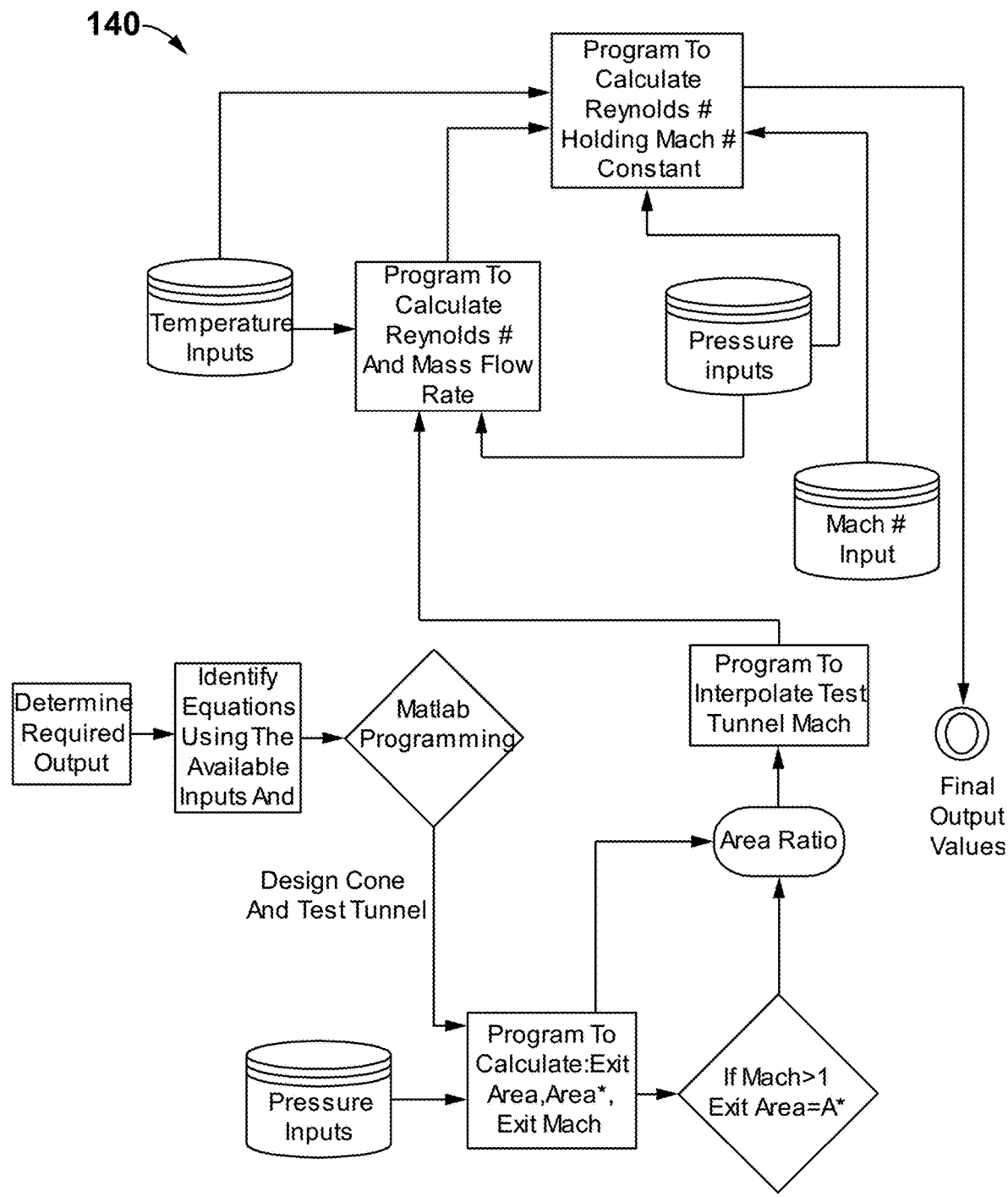
FIG. 25 illustrates a flowchart of a program set up for MATLAB stimulation utilized for calculation of the design of the present invention.

Referring to FIGS. 23 and 24, illustrates example equations utilized for the design of the present invention. Referring to FIG. 25, illustrates flowchart 140 of a program set up for MATLAB stimulation utilized for calculation of the design of the present invention. Referring to FIG. 26, the present invention provides a method of varying wind tunnel Reynolds, a design that could be utilized with existing facilities, replaces single nozzle with an effective variable nozzle and provides a design that allows quick and easy adjustment over a wide range of Reynolds number conditions from Mach 0.01 to 0.99.

Figure 28:
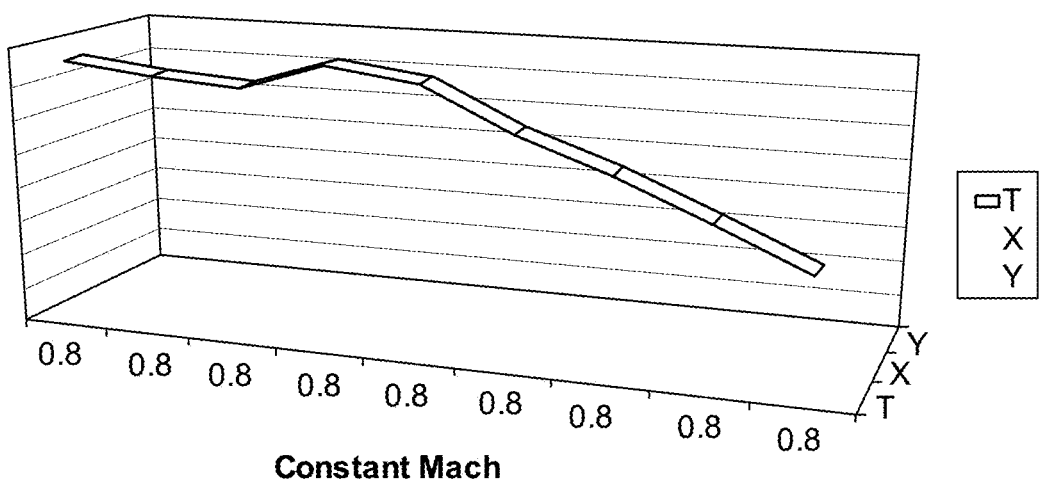

Referring to FIG. 27, benefits of variable Reynolds number test tunnel is disclosed, which include: provide a highly variable test environment in order to improve the development of advanced aerospace sensors, including: flow sensors to prevent compressor stall, optical sensors to enhance turbine and compressor airflow, and temperature sensors to increase efficiency of turbine. The optimal design of the present invention allows for adaptation to different size test tunnels, thus enabling various aerospace design applications. Referring to FIG. 28, an example graph 142 of temperature probe test values Vs variable RE and constant Mach is disclosed.

Referring to FIG. 29, initial research involved in design of the present invention is disclosed. the initial research includes finding research paper discussing use of wind tunnels focusing on design based on focus topics of probe testing, changing pressure, temperature, and/or density, Reynolds and Mach control. Further, analysing research papers to learn key components and to understand the requirements to meet the problem scope and investigation on VT resources, facilities, and test equipment available to aid in completing the problem scope.

Referring to FIG. 30, the device design challenges of the present invention includes rarity of studies or papers involving small test tunnels are made to test small devices such as sensors. Further, similarly sized test tunnels are formed that have similar capabilities to the program scope are only hypersonic flow. Totality of designs of variable Reynolds and Mach numbers require either a multitube of nozzle swaps to simulate any variance or changing test tunnel sizing, which is very costly and time consuming. Also, the Reynolds number is a dimensionless quantity expressing the ratio between a moving fluid's momentum and its viscosity. Referring to FIG. 31, equipment capabilities required for test tunnel design include sustain necessary pressure for required velocity, operate at low pressure and high flow rate, operate at high pressure and low flow rate, vary temperature from ambient to 700 kelvin, control the temperature and pressure settings and produce valid results based on initial calibration.

Referring to FIG. 32, equipment capabilities required for test tunnel design includes ability to maintain subsonic flow and obtain desired Reynolds number, which require ability to control air density, ability to vary and control air flow velocity and ability to vary and control pressure and temperature and optimal design would allow Reynolds number variation across $1 \times 10^6$ in subsonic conditions. Referring to FIG. 33, achieving final device design involves many simulations and cone designs, fifteen different device designs calculated to find the optimal range and control of resulting Reynolds number range, utilizes existing hot jet test rig to provide air flow, temperature, and pressure setting control and simulated various design ideas to optimize possible test tunnel-controlled conditions.

Referring to FIG. 34, three variable controls allows testing across a wide variety of conditions. The primary controls include temperature range from ambient to 672 kelvin, pressure range from ambient to 45 psi gauge, in 5 psi increments and device insertion distance of 0-254 millimetres for fine tuning of resulting Reynolds and Mach numbers. Referring to FIG. 35, examples of cone design considerations are disclosed. Referring to FIG. 36, accomplishments of the device 100 of the present invention includes, variable Reynolds reference tables, constant Mach variable Reynolds reference tables, optimized range of obtainable Reynolds numbers using available resources with minimal alteration, ability to change design to accommodate a wide variety of test tunnel sizes via direct extrapolation using tunnel/exit area ratios.

Referring to FIG. 37, accomplishments of the device 100 of the present invention further includes, ability to vary Reynolds number across a range of 5.5×107 while holding Mach number constant or varying Mach from 0.01 to 0.99, ability to control mass flow rate with varying temperature and Mach and a simple device design that can be optimized for many ranges of wind tunnel sizes, pressures, and temperatures-key feature for future designs.

Referring to FIG. 38, accomplishments of the device 100 of the present invention further includes, device design which utilizes existing and available VT facilities and equipment, design allows for wind tunnel testing of sensors, gauges, and other Reynolds and subsonic Mach dependent objects and lookup tables and simple adjustment methods allow quick and easy test tunnel condition changes.

For an example, the mass property calculation of the device 100 is as follows.

| Mass Properties Of Entire Assembly | | |
|---|---|---|
| Configuration: Cone Out Coordinate System: —Default— Mass = 88.94 pounds Volume = 409.37 cubic inches Surface Area = 1572.02 square inches | | |
| Center Of Mass: (inches) | | |
| X = 4.72 Y = 0.01 Z = 0.00 | | |
| Principal Axes Of Inertia And Principal Moments Of Inertia: (pounds * square inches) Taken At The Center Of Mass. | | |
| Ix = (1.00, 0.00, 0.00) | | Px = 683.72 |
| Iy = (0.00, 0.87, −0.49) | | Py = 14804.20 |
| Iz = (0.00, 0.49, 0.87) | | Pz = 14805.85 |
| Moments Of Inertia: (pounds * square inches) Taken At The Center Of Mass And Aligned With The Output Coordinate System. | | |
| Lxx = 683.73 | Lxy = 9.68 | Lxz = −5.60 |
| Lyx = 9.68 | Lyy = 14804.45 | Lyz = −0.79 |
| Lzx = −5.60 | Lzy = −0.79 | Lzz = 14805.40 |
| Moments Of Inertia: (pounds * square inches) Taken At The Output Coordinate System. | | |
| Ixx = 683.74 | Ixy = 12.58 | Ixz = −7.28 |
| Iyx = 12.58 | Iyy = 116784.00 | Iyz = −0.79 |
| Izx = −7.28 | Izy = −0.79 | Izz = 16785.04 |

In the foregoing description, the apparatus of the present invention have been described with reference to specific examples. It is to be understood and expected that variations in the principles of the apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. An apparatus for controlling the subsonic air flow of a wind tunnel, the apparatus comprising:
a variable air heater;
a pressure release value system; and
a variable nozzle, comprising:
an inverse cone assembly, the inverse cone assembly further comprising:
an adjustment rod;
a cone, that is connected and locked onto the adjustment rod,
wherein the cone and the rod are supported by a stainless end flange with a thickness that allows for minimal movement along the y and z axis through its x axis insertion distance,
wherein the apparatus allows for continuously adjustable Reynolds Number or Mach Number defined subsonic air flow parameter.

2. The apparatus according to claim 1, wherein the variable air heater allows for a static setting of a temperature.

3. The apparatus according to claim 1, wherein the pressure release valve system allows for a static setting of an air pressure.

4. The apparatus according to claim 1, wherein the inverse cone assembly of the nozzle allows for a precise set of an air flow exit area.

5. The apparatus according to claim 1, wherein the variable nozzle is constructed of stainless steel.

6. The apparatus according to claim 1, wherein the inverse cone assembly is 10 inches in length and the cone is 2 inches in diameter at its widest end.

7. The apparatus according to claim 1, wherein a shape of the cone is defined according to the equation $y=(x/10)^{0.7}$.

8. The apparatus according to claim 1, the cone further comprises a cutout portion designed to allow for threaded receiving of the adjustment rod.

9. The apparatus according to claim 1, wherein the adjustment rod is 17.50 inches in overall length and 1.25 inches in overall diameter.

10. The apparatus according to claim 1, the adjustment rod further comprises a chamfer lead in/out edge measuring 1.50 inches in length.

\* \* \* \* \*